US009256619B2

(12) United States Patent  (10) Patent No.: US 9,256,619 B2
Ely  (45) Date of Patent: Feb. 9, 2016

(54) METHOD FOR DETECTING AND RECOGNIZING BOATS

(71) Applicant: RAYTHEON COMPANY, Waltham, MA (US)

(72) Inventor: Richard W. Ely, Lewisville, TX (US)

(73) Assignee: RAYTHEON COMPANY, Waltham, MA (US)

( * ) Notice: Subject to any disclaimer, the term of this patent is extended or adjusted under 35 U.S.C. 154(b) by 138 days.

(21) Appl. No.: 14/167,658

(22) Filed: Jan. 29, 2014

(65) Prior Publication Data

US 2015/0213059 A1  Jul. 30, 2015

(51) Int. Cl.
*G06K 9/00* (2006.01)
*G06F 17/30* (2006.01)
*G06K 9/62* (2006.01)
*G06K 9/66* (2006.01)
*G06K 9/46* (2006.01)

(52) U.S. Cl.
CPC .... *G06F 17/30256* (2013.01); *G06F 17/30112* (2013.01); *G06K 9/4609* (2013.01); *G06K 9/6267* (2013.01); *G06K 9/66* (2013.01); *G06K 2209/27* (2013.01)

(58) Field of Classification Search
None
See application file for complete search history.

(56) References Cited

U.S. PATENT DOCUMENTS 6,249,241 B1 * 6/2001 Jordan et al. ............... 342/41

* cited by examiner

*Primary Examiner* — Nirav G Patel
*Assistant Examiner* — Amandeep Saini
(74) *Attorney, Agent, or Firm* — Christie, Parker & Hale, LLP (57) ABSTRACT

Method for recognizing boats in a port includes: establishing land/water boundaries from an image of the port including one or more boats, using a land mask and image statistics, without requiring a site model; utilizing the established land/water boundaries to determine thresholds and normalization parameters; detecting one or more bow candidates for the boats in the image; computing an orientation of each of the boats with detected bows; computing features along the bow candidates to eliminate false bow candidates; fitting boat models to the detected one or more bow candidates; determining one or more best fit models from the fitted boat models; calculating features in an interior, exterior and outline of the best fit models; applying a statistical classifier to score each of the one or more best fit models and to eliminate false alarms; and eliminating lower scoring best fit models.

8 Claims, 6 Drawing Sheets

Boat Image

Gradient Magnitude

Gradient Phase

METHOD FOR DETECTING AND RECOGNIZING BOATS

FIELD OF THE INVENTION

The present invention relates generally to object recognition; and more particularly to a method for recognizing boats.

BACKGROUND

In data processing, feature extraction is a special form of dimensionality reduction. When the input data to a process (algorithm) is too large to be processed and it includes some redundancy, the input data may be transformed into a reduced representation set of features, i.e., a features vector. If done properly, the features set includes the relevant information from the input data to perform the desired task using the reduced representation by the feature vectors. Feature extraction techniques simplifies the amount of data required to describe a large set of data accurately.

Feature extraction has been widely used in image processing and object recognition which use different algorithms to detect and isolate various features of a dataset, for example, digitized image or video, and recognize object(s) within those images or videos. Object recognition is the task of finding and identifying objects in an image or video sequence. Many approaches to the task have been implemented over past several years, such as edge detection, or recognition by parts. In a typical feature-based approach, such as edge detection, a search is used to find feasible matches between object features and image features. The primary constraint in these approaches is that a single position of the object must account for all of the feasible matches. These methods then extract features from the objects to be recognized and the images to be searched.

Classification is a method of identifying to which of a set of categories (classes) a new observation belongs, on the basis of a training set of data containing observations (or instances) for which their category is already known. The individual observations are analyzed into a set of quantifiable properties, known as features.

A classifier is a classification algorithm. In the context of machine learning, classification is considered an instance of supervised learning, for example, learning where a training set of correctly identified observations (features) is available. The corresponding unsupervised procedure is known as clustering, which comprises of grouping data into categories based on some measure of inherent similarity. For example, the distance between instances, considered as vectors in a multi-dimensional vector space. In machine learning, the observations are often known as instances, the explanatory variables are termed features and the possible categories to be predicted are classes.

A common subclass of classification is probabilistic classification. Algorithms of this nature use statistical inference to find the best class for a given instance. Unlike other algorithms, which simply output a best class, probabilistic algorithms output a probability of the instance being a member of each of the possible classes. Typically, the best class is then selected as the one with the highest probability.

Classification and clustering are examples of the more general problem of pattern recognition, which is the assignment of an output value to a given input value. Other examples are regression, which assigns a real-valued output to each input; or sequence labeling, which assigns a class to each member of a sequence of values, for example, part of speech tagging, which assigns a part of speech to each word in an input sentence.

A training set is a set of data used to discover potentially predictive relationships. In machine learning field, a training set includes an input vector and an answer vector, which are used together with a supervised learning method to train a knowledge database. In statistical modeling, a training set is used to fit a model that can be used to predict a "response value" from one or more "predictors." The fitting can include both variable selection and parameter estimation. Statistical models used for prediction are often called regression models, of which linear regression and logistic regression are two examples.

Most of the current Ocean Ship Detection (OSD) screening algorithms are designed to operate in open ocean and use a land mask to eliminate the parts of the scene that are on or near land. Screening algorithms designed to operate in areas adjacent to land, e.g., ports, harbors, piers, etc., typically require a site model. A site model is typically a set of 2D or 3D polygons with geographic coordinates for the vertices. The polygons define areas where boats are likely to be found, for example, next to piers, and areas where boats are not found, for example, on tops of buildings, trees, etc.

Accordingly, there is a need for a boat recognition technique that is capable of recognizing boats both in the water and on shore, does not require a site model, and is less complex and computationally intensive and provides high accuracy for the recognition.

SUMMARY

The "boats in port" methods of the present invention operate in the area along the shoreline to find boats both in the water and on shore. While many OSD methods have no recognition capability, the new method of the present invention matches a database of 2D or 3D models of boats to both recognize the type of boats detected and eliminate false alarms.

In some embodiments, the present invention is a method for recognizing boats in a port. The method includes: establishing land/water boundaries from an image of the port including one or more boats, using a land mask and image statistics, without requiring a site model; utilizing the established land/water boundaries to determine thresholds and normalization parameters; detecting one or more bow candidates for the boats in the image; computing an orientation of each of the boats with detected bows; computing features along the bow candidates to eliminate false bow candidates; fitting boat models to the detected one or more bow candidates; determining one or more best fit models from the fitted boat models; calculating features in an interior, exterior and outline of the best fit models; applying a statistical classifier to score each of the one or more best fit models and to eliminate false alarms; and eliminating lower scoring best fit models whose outline overlaps an outline of a higher scoring boat to obtain a more accurate result, wherein the method is performed by one or more computers.

DETAIL DESCRIPTION

In some embodiments, the present invention computes the boat candidates by looking for the bows of boats, both in the water and on land near the water, in an image (for example, a panchromatic image) of a harbor or a port scene.

Figure 1:
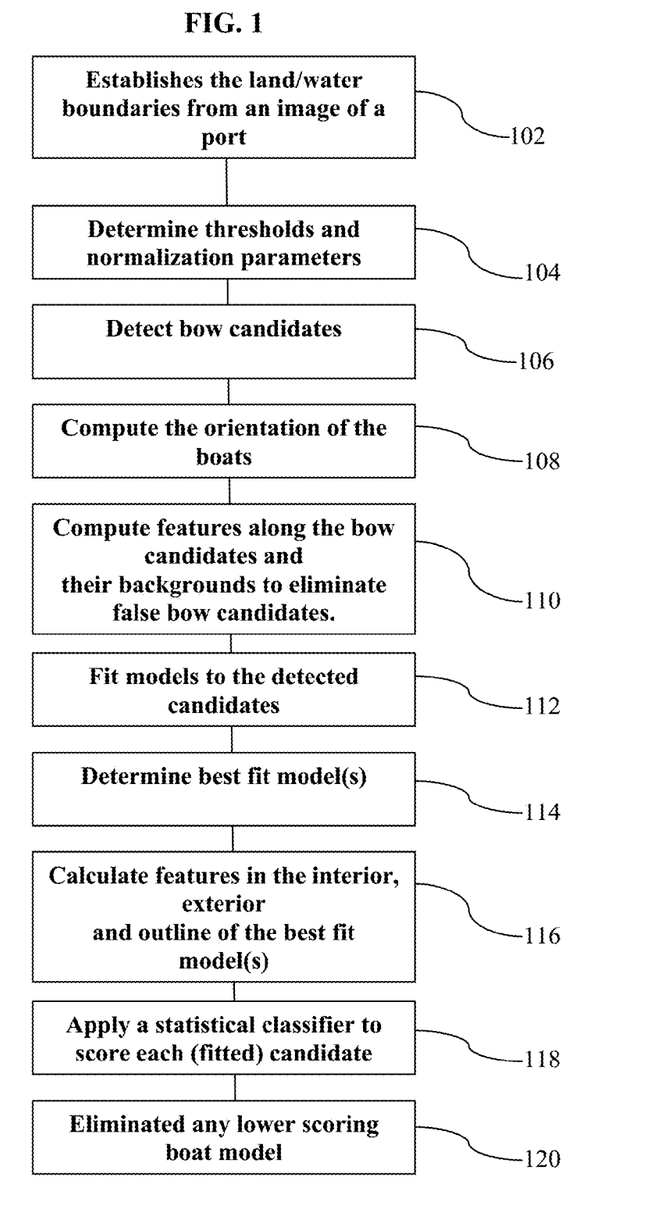
FIG. 1 is an exemplary process flow, according to some embodiments of the present invention.

FIG. 1 is an exemplary process flow 100 executed by one or more computers, according to some embodiments of the present invention. As shown in block 102, the present invention establishes the land/water boundaries from an image of a port including one or more boats, each boat having a bow, using a land mask derived from a digital elevation model such as Digital Terrain Elevation Data (DTED). DTED sets elevation posts over the ocean to mean sea level. The land mask determination algorithm accumulates all mean sea level posts into contiguous regions. The land mask is all the posts not designated as ocean. Since some land areas can be below sea level, any contiguous region not connected to the main ocean region is re-designated as land. This initial land mask can be inadequate for several reasons. First, the post spacing of the DEM is generally much coarser than the spatial resolution of the image. Second, the action of the tides causes more land to be exposed at some times than others. Third, the DEM may be out of date and does not correctly describe the shoreline as it currently exists. Fourth, the geographical position of the posts may not project correctly into the image due to inaccuracies in the DEM or inaccuracies in the geometric metadata associated with the image.

As a result, in some embodiments, the invention refines the land/water boundary using image statistics on intensity and gradient. The invention uses the water pixels that are sufficiently far from the land mask and the land pixels that are sufficiently far from the water. It histograms both the intensity and the gradient magnitude for the land and water regions separately. It then looks for optimal dynamic thresholds that separate the land distribution from the water distribution. These thresholds are used to refine the land/water boundary to a higher resolution and higher accuracy than the initial land mask calculated from the digital elevation model. The region land-water boundary region in which the boat detection and recognition operates is defined as any water pixel that is near land and any land pixel that is near water. The two distance thresholds do not have to be the same.

In block 104, the invention utilizes the established land/water boundaries image to determine thresholds and normalization parameters for the boat search. In block 106, the invention detects bow candidates for the boats in the image and in block 108, the orientation of the boats with detected bows are computed. In block 110, the invention computes features along the bow candidates and their backgrounds to eliminate false bow candidates. In block 112, two-dimensional (2D) or three-dimensional (3D) boat models are then fit to one or more of the remaining bow candidates, from a database of boats expected to be at the port. One or more best fit model(s) are then determined from the fitted models, in block 114.

In some embodiments, for each boat model, the invention fits the model to the image and then extracts features from the interior, outline and exterior of the model. The invention then applies thresholds to the features to eliminate models that do not fit well with the image. If a model survives the thresholding process, then a statistical classifier score is computed from the features. This classifier score also has a threshold to eliminate ill-fitting models. It may be that none of the models passes the feature thresholds and/or classifier score. If so, then no candidate is carried forward to the consolidation step. If one or more models pass the feature thresholds and classifier, then the model with the best classifier score is retained and the lower scoring models are eliminated. This process associated with a particular bow candidate point is different than the consolidation process, in which overlapping boats that may have come from different bow points are eliminated.

Features are calculated in the interior, exterior and outline of the best fit model(s), in block 116. In block 118, a statistical classifier is applied to score each (fitted) candidate and to eliminate false alarms. In block 120, any lower scoring boat model whose outline overlaps that of a higher scoring boat is eliminated to obtain a more accurate result. By this point in the processing every boat candidate has a particular model associated with it and position and an orientation in the image for that model. That defines an outline in image space. Since every boat candidate has an outline, the area of intersection between interiors of the two outlines can be computed. If the lower scoring candidate's outline does not intersect (or just barely intersects), the outline of the higher scoring boat candidate is retained. But if the outline has sufficient overlap with the higher scoring candidate, it is eliminated.

The invention utilizes several novel features for eliminating false bow candidates and boat false alarms. The identification of the land/water boundary is done automatically and does not require a site model like those that many of the existing methods use.

Figure 2:
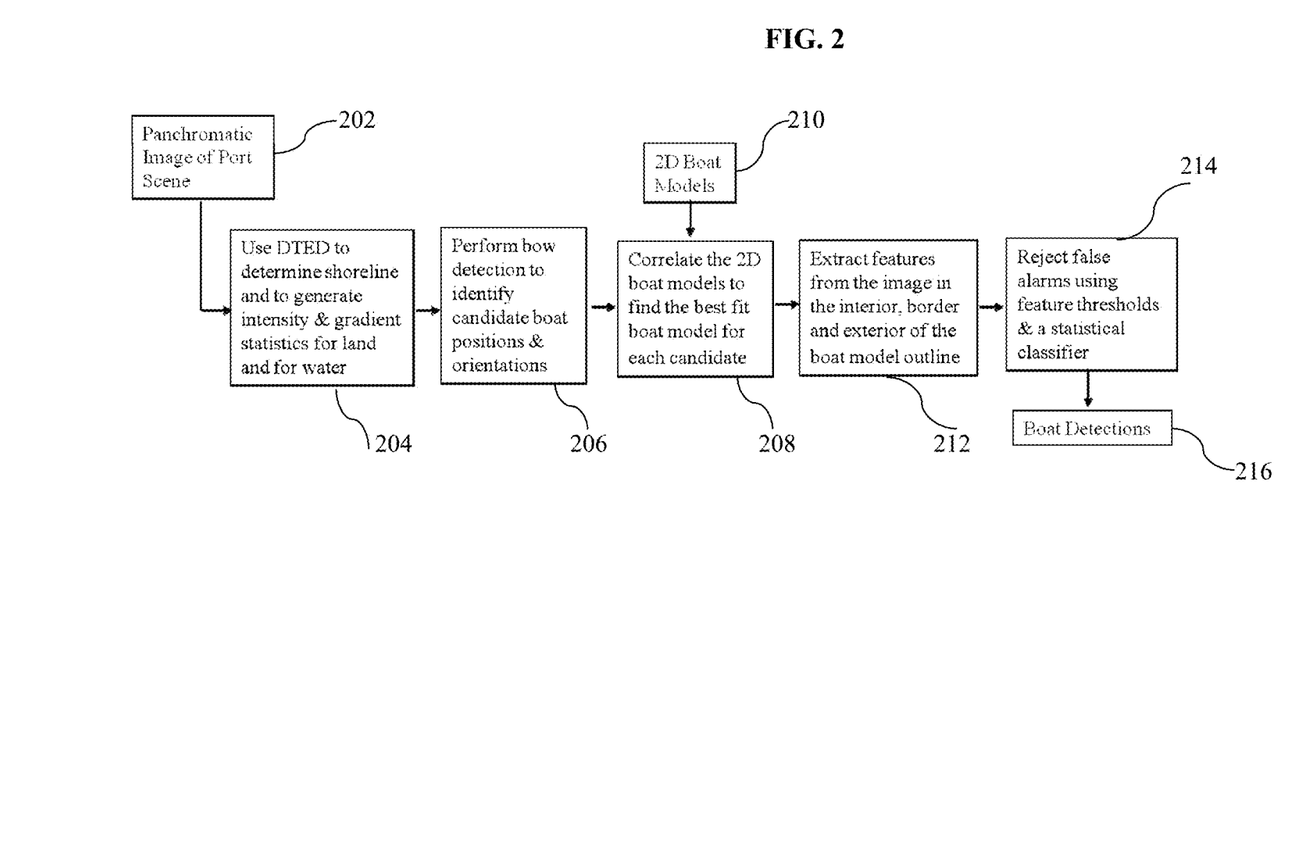
FIG. 2 is an exemplary process flow, according to some embodiments of the present invention.

FIG. 2 is an exemplary process flow 200 executed by one or more computers, according to some embodiments of the present invention. As shown in block 202, an image, for example, a panchromatic image of a port is received. A panchromatic image is a realistic reproduction of a scene as it appears to the human eye. In block 204, a land mask is computed from the received image (DTED) by processing only the region of the image that is close to the land/water boundary. This process looks for boats both in the water and on land.

In some embodiments, the process uses (slightly) different processing and thresholds for land detections than for water detections. Since the land/water boundary from the DTED derived land mask may not exactly match the true location in the image (due to tides, image geometry errors or out-of the DTED data), intensity statistics and gradient statistics are collected from the land regions and separately from the water regions and dynamic thresholds are computed to refine the land/water boundary. In some embodiments, dynamic thresholds for boat candidate detection and normalization parameters for scaling the boat features that are computed for each candidate are also determined.

Since not all images have the same dynamic range and in some images the contrast of the object with the background is lower than in other images, dynamic thresholds are used. For example, for a high contrast image, a higher threshold on the gradient is used than one for a low contrast image. A dynamic threshold method according to the present invention divides the land areas of the image (as defined by the land mask) into cells and computes the average gradient in each cell. The dynamic bow threshold is then determined by a factor times the average gradient of the highest gradient cell.

In block 206, the boat bows are detected to identify candidate boat positions and orientations. A more detailed description of this process is given referring to FIG. 3.

Figure 3:
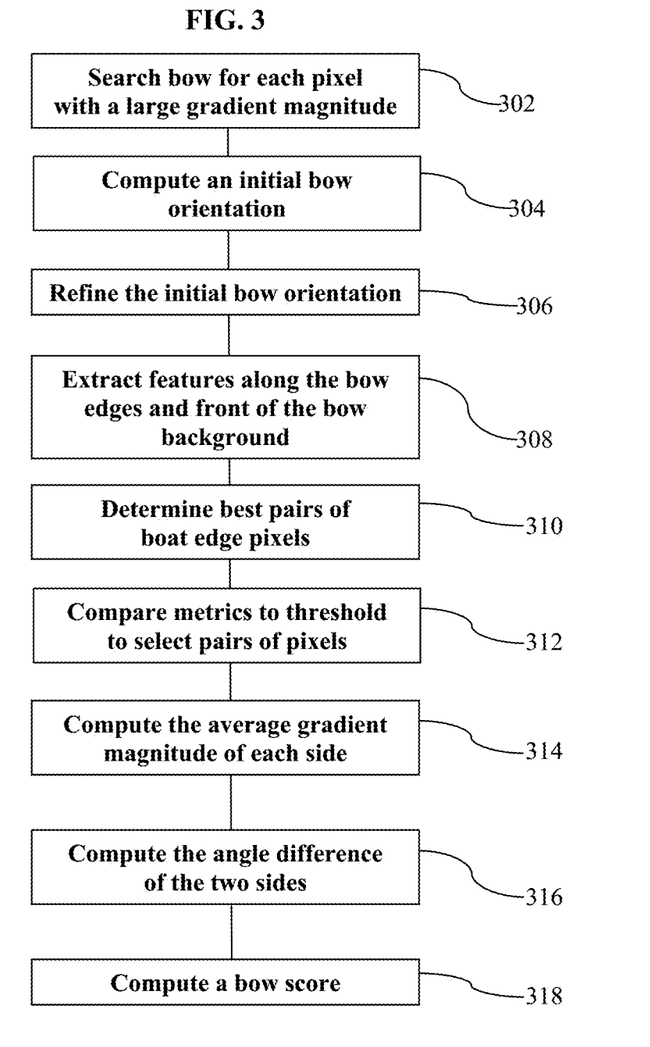
FIG. 3 is an exemplary process flow for feature extraction from a boat model, according to some embodiments of the present invention.

FIG. 3 is an exemplary process flow, executed by one or more computers, for feature extraction from a boat model, according to some embodiments of the present invention. As depicted in block 302, each pixel the gradient magnitude of which, is above the determined dynamic threshold, initiates a bow search. In block 304, an initial bow orientation is established, for example, using a four-pixel template at eight regularly spaced orientations looking for the orientation that has the highest contrast with the background.

Figure 6:
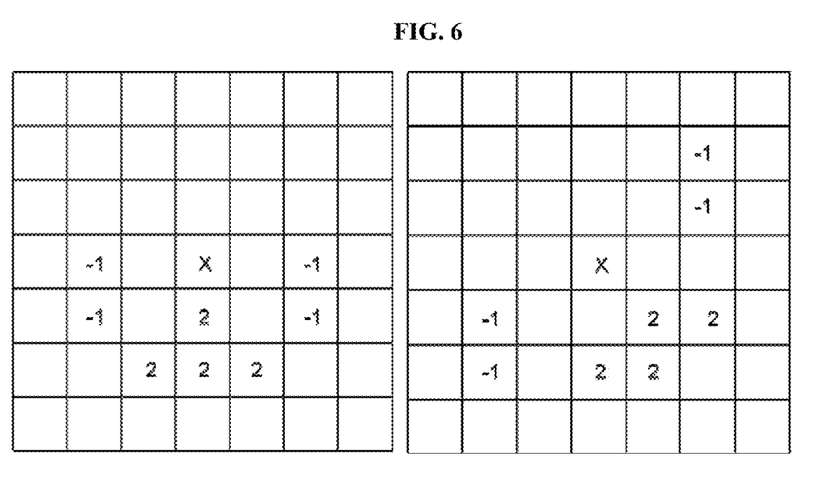
FIG. 6 shows exemplary four-pixel templates for 0 and 45 degrees oriented at 0 degrees and at 45 degrees, according to some embodiments of the present invention.

FIG. 6 shows these templates oriented at 0 degrees and at 45 degrees. The X indicates the pixel location of the bow candidate. The other six templates are formed by rotating these two templates by 90 degrees, 180 degrees and 270 degrees. The metric is a weighted sum of the intensity values with the weights. The pixels with a weight value of 2 are considered boat pixels and the pixels with a value of −1 are considered background pixels. Accordingly, for a boat that is brighter than its background and oriented with stern to bow pointing up, the 0 degree template would return a strong positive score. If the boat were oriented at 45 degrees the template on the right in FIG. 6 would return the strongest score. If a boat were darker than its background then the most negative score would be the best choice for boat orientation. As a result, the absolute value of the template score gives a crude estimate of the boat orientation and the sign of the score (+ or −) gives the contrast (light or dark) of the boat candidate.

In some embodiments, this template is designed to run fast and to establish a rough estimate of the orientation of the boat. The score also gives an indication of whether the bow pixel (denoted by X) is really on the nose of a bow-like object. Pixels along a straight edge in the image can have a high gradient and therefore start out as a bow candidate. Other templates with different number of pixels and orientations may also be used.

Referring back to FIG. 3, in block 306, the bow orientation is then refined using a weighted histogram of the bow edge phase on each side of the bow (with gradient magnitude as the weight). In some embodiments, the invention generates a weighted histogram of the gradient phases (e.g., modulo 180°) using a bin width of 5 degrees with the gradient magnitude as the weight.

Figure 7:
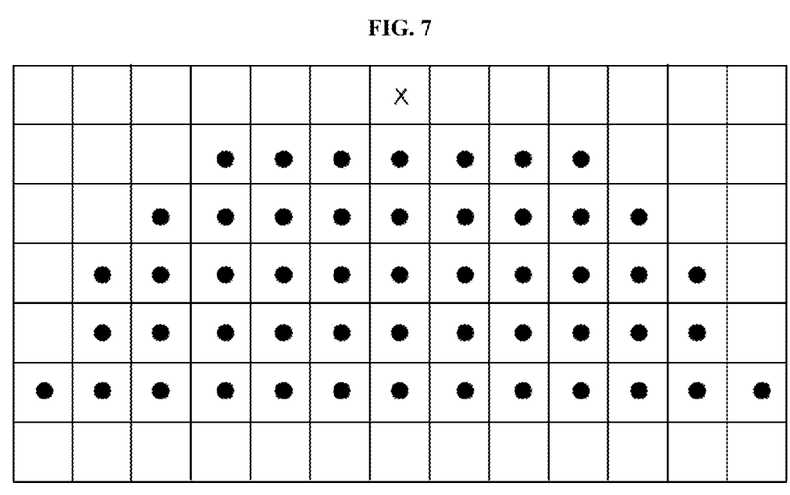
FIG. 7 depicts an exemplary pixel region for gradient phase histogram of 0 degree candidate, according to some embodiments of the present invention.

FIG. 7 depicts an exemplary pixel region for gradient phase histogram of 0 degree candidate, according to some embodiments of the present invention. The pixels whose phases are histogrammed for a boat whose rough orientation was computed to be 0 degrees, are shown. Similar regions exist for 45 degrees, 90 degrees, etc. The region is set to be wide to accommodate different bow types. Some boats have sharp bows while other boats have more rounded bows. When the gradient phase of these pixels are histogrammed using the gradient magnitude as the weight, it is expected that the principal peak in the histogram is associated with the phases of one side of the bow or the other. Also, there is a secondary peak associated with the opposite side of the bow. The bow orientation is refined by finding the principal peak and the secondary peak and computing the bow orientation as the bisector of the two angles defined the phases of the principal and secondary peaks.

Figure 4A:
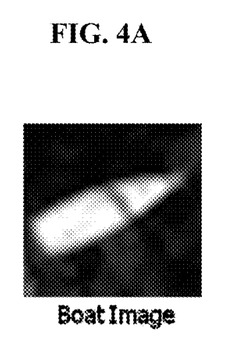
FIGS. 4A to 4C depict examples of a bow gradient and the phase for a boat, according to some embodiments of the present invention.
Figure 4B:
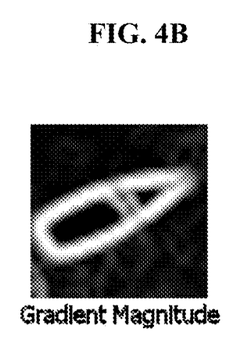
Figure 4C:
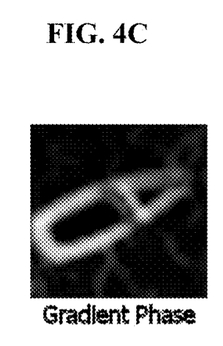

FIGS. 4A to 4C depict examples of a bow gradient and the phase for a boat, according to some embodiments of the present invention. The gradient is a vector that points perpendicular to the edge direction and its length is proportional to the edge contrast (or edge strength). The middle picture depicts the magnitude using brightness and the last picture illustrates the phase direction using color.

In some embodiments, the principal phase direction (which is usually on the higher contrast side of the bow) and the secondary peak in the phase histogram (which is on the lower contrast side) are determined. The estimated bow orientation is then computed as the orientation of the bisector of the acute angle between these two phase directions Since the criteria used to start a bow search was the gradient magnitude above a threshold, the great majority of pixels that pass the threshold are not a point at the nose of a bow. That is, any pixel along a strong edge could have a gradient magnitude above the threshold whether it is at a bow or not. The above processing tries to eliminate such non-bow edge pixels as early in the processing as possible.

In some embodiments, the non-bow candidates are eliminated as early as possible to reduce the computation complexity of the process, for example, in the model fitting process. Accordingly, features along the bow edges and from the immediate background in front of the bow are extracted to determine whether this location looks like the bow of a boat, as shown in block 308 of FIG. 3.

In block 310, using the computed bow orientation, the invention steps along the front portion of the boat candidate looking for the best pairs of boat edge pixels (one on each side) with the metric being gradient magnitude (e.g., edge strength) times the pixel's gradient phase match against an expected phase computed from the initial bow orientation. Based on the derived orientation estimate for the boat and the sign of its contrast with the background (lighter or darker than the background), an expected range for the gradient phase on each side of the bow is computed. This range allows for sharp bows and rounded bows. The process of the present invention then steps down the central axis of the bow (as defined by the bow point and bow orientation) and looks for the best bow edge pixels on each side in the direction perpendicular to the bow bisector axis. The search for the best bow pixels on each side is restricted to pixels that are a local gradient magnitude maximum in the gradient phase direction and whose phase is within the expected range for that side of the bow.

The process of the present invention finds the best pair of pixels (one on each side) whose distance between them is within a maximum bow width and whose gradient magnitude sum is greater than any other candidate pair. Note the maximum width threshold increases as the invention traverses away from the bow point since the boat will typically get wider as one moves away from the bow. Also note that for a particular step, the invention may not find a pair that meets given criteria. If the process does find a pair, the pixel locations are retained for use in feature calculations and the current boat width is updated. In either case (whether a pair is found or not), the invention steps one pixel further in the bow direction and repeats the process of searching for bow pairs. The invention continues to do this up to the time when maximum number of steps is reached, which is based on the spatial resolution of the image.

For each pair of boat edge pixels, the invention retains features at the two edge points (one on each side of the bow). The features are the gradient magnitude, the gradient phase, the width between the points, the distance of each point from the center bisector line. These set of bow pairs are used to compute bow features. The bow direction is updated from the initial estimate by computing the direction of the line segment from bow point to the midpoint of the last pair of bow edge points that were collected. The bow angle (ranging from sharp to rounded) are also estimated based on the angle at the bow point of the triangle formed from the bow point location and the locations of the last pair of bow points. The two sides of this triangle that contain the bow point allow the determination of the expected gradient phase at each point along that side. Pairs of pixels whose metrics pass a threshold are marked (selected) for the bow features calculation, in block 312.

Referring back to FIG. 3, in block 314, at these points, the invention computes the average gradient magnitude of each side and the absolute difference of the distance between one side of the bow to the center line of the boat, i.e., the line through the bow point in the direction defined by the computed orientation, and the distance between the other side and the center line. In block 316, the angle difference between the phase at the point on one side with the bow orientation direction and the same metric for the other side are also computed and the absolute difference between these two angles is calculated. Explaining this feature in other words: It is expected that a real bow to be symmetric along its central axis. So two bow edge points directly opposite each other on the two sides of the bow should have edge directions that make the same angle with the center axis. This feature measures that symmetry property. Accordingly, the top scoring features come from high contrast symmetric objects.

This initial set of bow metrics may have some false candidates in the midst of areas of high gradient activity and along stripes (such as along the middle or side of a road). Since bows tend to have less gradient activity in the area in front of the bow, the invention uses developed features/metrics to exploit this aspect of the boat bows. For example, one feature that measures the level of activity in front of the bow is the average gradient in a region off the bow. As another example, a more sophisticated feature may measure how chaotic the area in front of the bow is.

To measure how chaotic an area is, the invention generates a weighted histogram of the gradient phases (modulo 180) using a bin width of 5 degrees with the gradient magnitude as the weight. From the histogram, the invention computes the standard deviation of the counts of two consecutive bins over the entire histogram. Chaotic areas (such as the rocks on jetties and other unwanted objects) have less organized phases and therefore much smaller standard deviations.

To detect false candidates along a stripe, the invention steps along the area in front of the bow in the direction pointing directly away from the bow. At each step, the invention computes the highest gradient magnitude pair whose gradient phases point to the right and left of the bow orientation direction. The invention then computes the average magnitude over these pixels. Finding a series of strong edge points whose phases are perpendicular to the bow orientation is an indication that the candidate is on a stripe. These "off-the-bow" features are then normalized by dividing by the average gradient of the bow pixels.

Finally, the invention uses these calculated features to compute a bow score, as depicted in block 318. In some embodiments, the bow score is determined by multiplying individual bow features together. The features that are used are: 1) the number of bow pairs; 2) the average gradient magnitude over all the bow points; 3) the average side angle difference over all the bow pairs; 4) the average width difference between the distance from one point of the bow pair to the center and the distance of the other point to the center; and 5) the average gradient phase match of all the bow points to the expected phase. Note that for features 3) and 4) a smaller value is better and thus in the multiplicative score these values are subtracted from a constant to turn them into positive values. In some embodiments, thresholds are applied to the bow score and to the individual features to determine which bow candidates to eliminate. Since the thresholds were based on ground truth training data from many images containing many boats and many false alarms, the established training threshold values that retained the real boats while eliminating most of the false alarms results in many fewer candidates proceeding to the model fitting which is computationally expensive. The surviving bow locations are then passed on to the model fitting block (block 208 of FIG. 2).

Referring back to FIG. 2, in block 208, boat models 210 stored in a model database are correlated with the remaining bow candidates to find the best fit model for each of the detected candidates. The boat models may be 2D models, 3D models or a combination of both that have already been developed and stored. In some embodiments, only the models of the boats that are likely (more than a certain probability) to be found in the port of interest are used. In some embodiments, the 2D model comprises of a 2D outline of the hull. The 2D outline is stored in the database in x, y coordinates in units of meters and is projected into the image using the image geometry. As a preprocessing step before model fitting, each model is projected into the image at a full 360 degree orientation range with 0.5 degree increments. For a 3D model, the model is rendered using the image geometry and sun geometry to project the 3D model to exactly how it would appear in the image. The rendering uses surface shaded relief to assign an intensity to each pixel in the rendered model, for example, using a Lambertian surface assumption. The rendering correctly handles suppressing occluded surfaces and rendering sun shadows. In some embodiments, it is assumed the boat is horizontal to the ground, i.e., not tilted, and each model is rendered at half degree increments through a 360 degree range. A more detailed description of correlating models with bow candidates is given referring to FIG. 5.

Figure 5:
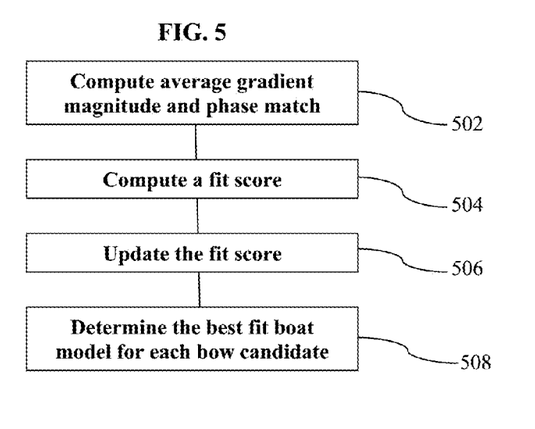
FIG. 5 is an exemplary process flow for correlating models with bow candidates to determine best fit boat model, according to some embodiments of the present invention.

FIG. 5 is an exemplary process flow, executed by one or more computers, for correlating models with bow candidates to determine best fit boat model, according to some embodiments of the present invention. In some embodiments, the invention loops through a range of bow locations and orientations determining which boat model fits best with the image. The bow finding process has provided a good estimate of the boat's bow location and the boat's orientation, but it may not be sufficiently precise, depending on the application. Therefore, in some embodiments, the invention performs the model matching over a small 2D set of possible corrections to the bow image location and small range of corrections to the estimated boat orientation. The best match over all the possible corrected bow locations and possible boat orientations is retained as the candidate match for that boat model. As depicted in block 502, for a particular offset, orientation and model, the model fitting process computes the average gradient magnitude and the average gradient phase match between the image's gradient phase at the outline points and the expected phase from the model. A fit score is then computed as a function of the bow (candidate) score, the average gradient magnitude and the average phase match from the model outline points, in block 504.

Optionally, the fit score may be updated based on more features, as shown in block 506. For example, in some embodiments, for the highest fit scoring locations/points, several other features are computed. For instance, the invention determines whether the bow is on land or in the water. For this, the invention examines the area off the front of the bow and determines what percentage of the pixels of that area whose metrics (e.g., intensity & gradient) fall in the water range. If the boat is determined to be on land, a shadow of the boat on the ground from the down sun edge of the boat is expected in the image. In some embodiments, the invention searches outward from the down sun boat edge in the shadow direction to find the strongest edge of the appropriate phase. In this case the edge magnitude and phase match of the shadow are averaged with the boat outline metrics and the fit score is updated. The result is that boat candidates on land that do not have a good shadow get a weaker fit score. For boats in water, the shadow is not very apparent and in this case, the invention (optionally) does not search for a shadow and does not update the fit metrics or score. The best fit boat models for each bow candidate are then determined in block 508.

Referring back to FIG. 2, in block 212, features are extracted from the image in the interior, exterior and border for the boat model outline. A set of computed features compare the gradient magnitude and phase match a few pixels exterior to the model against those at the model outline. If this is a true boat, it is expected the gradients in the image at the model outline pixels to be stronger than those exterior to the model outline and the phase match with the model would be better at the outline points than the match a few pixels to the exterior of the outline. In some embodiments, the following features are computed: a) the ratio of the outer gradient magnitude to the outline gradient magnitude; b) the ratio of the outer phase match to the outline phase match; and c) the product of these two ratios.

In some embodiments, the invention also computes three metrics over all the pixels interior to the boat outline. The first is the average gradient over those pixels. The second looks at each pixel and finds the absolute intensity difference with its immediate neighbors, for example, immediate eight neighbors. The median absolute difference with the neighbors is then computed. It is expected that the interior of the boat is more organized than many of the false alarms and therefore the interior has a smaller average median neighbor difference than some types of false alarms. The invention also computes the same chaos metric described earlier in the bow features section, but this time the metric is computed over the interior of the outline. This process is performed for each boat model and feature thresholds are applied thereto to eliminate poor scoring candidates.

In some embodiments, the invention also applies a statistical classifier to the boat model features to further eliminate false alarms, as depicted in block 214. The best surviving candidate (if any), along with its boat model, orientation and classifier score, is retained for a final consolidation step. The consolidation step sorts the detections by classifier score and then runs through the sorted list determining if any lower scoring detection has significant overlap with a higher scoring detection. From the model matching each candidate has a 2D outline in image coordinates. Therefore one can determine if a lesser scoring candidate occupies some of the same space as the higher scoring candidate, i.e., their outlines intersect each other. If the area of intersection between the two outlines is significant, then the lower scoring boat is eliminated. This process can produce detections with overlapping outlines.

Finally, the boats that survive the consolidation are output (for example, to an XML file) including the boat type, the bow location, the boat orientation and an image chip of the boat, as shown in block 216.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

The invention claimed is:

1. A computer implemented method for recognizing boats in a port, each boat having a bow, the method comprising:
   receiving, by a receiver, a digital image of the port that includes one or more boats
   establishing, by one or more processor, land/water boundaries from the digital image of the port including one or more boats, using a land mask and image statistics, without requiring a site model;
   utilizing, by the one or more processor, the established land/water boundaries to determine thresholds and normalization parameters for the one or more boats;
   detecting, by the one or more processor, one or more bow candidates for the boats in the image responsive to the determined thresholds and normalization parameters;
   computing, by the one or more processor, an orientation of each of the boats with detected bows;
   computing first features along the bow candidates to eliminate false bow candidates responsive to the orientations;
   fitting, by the one or more processor, boat models to the detected one or more bow candidates, responsive to the orientations and the first features;
   determining, by the one or more processor, one or more best fit models from the fitted boat models;
   calculating second features in an interior, exterior and outline of the best fit models;
   applying, by the one or more processor, a statistical classifier to score each of the one or more best fit models and to reduce false alarms for the best fit models; and
   eliminating, by the one or more processor, lower scoring best fit models whose outline overlaps an outline of a higher scoring best fit model to obtain a more accurate result for the recognizing boats.

2. The method of claim 1, wherein boat models are 2-dimensional or 3-dimensional models stored in a database.

3. The method of claim 1, further comprising:
   sorting, by the one or more processor, the remaining best fit models by their scores in a list;
   determining, by the one or more processor, whether any best fit model with a lower score has overlap with a best fit model with a higher score; and
   eliminating said best fit model with a lower score from the list.

4. The method of claim 1, wherein computing first features along the bow candidates further comprises:
   initiating, by the one or more processor, a bow search for each pixel the gradient magnitude of which, is above a determined threshold;
   computing an initial bow orientation using a multi-pixel template at regularly spaced orientations looking for an orientation that has the highest contrast with an immediate background in front of and to the sides of the bow;
   refining, by the one or more processor, the bow orientation using a weighted histogram of a bow edge phase on each side of the bow;
   extracting, by the one or more processor, features along the bow edges and from an immediate background in front of the bow;
   utilizing the computed initial bow orientation, stepping along a front portion of the boat candidate looking for the best pairs of boat edge pixels on each side using gradient magnitude times the pixel's gradient phase match against an expected phase computed from the initial bow orientation;

selecting, by the one or more processor, pairs of pixels whose metrics pass a determined threshold;

for the selected pairs of pixels, computing an average gradient magnitude of each side and an absolute difference between a distance from one side of the bow to a center line and a distance between the other side and the center line;

computing an angle difference between a phase at the point on one side with the bow orientation direction and the same metric for the other side and calculating an absolute difference of the angle difference to calculate features;

using, by the one or more processor, the calculated features to compute a bow score; and eliminating, by the one or more processor, bows with bow scores lower than a predetermined value.

5. The method of claim 4, further comprising applying by the one or more processor, thresholds to the bow score and to the calculated features to determine which bow candidates to eliminate.

6. The method of claim 4, wherein the bow score is computed by multiplying the calculated features together.

7. The method of claim 6, wherein the calculated features together include one or more of a number of bow pairs, an average gradient magnitude over all the bow points, an average side angle difference over all the bow pairs, an average width difference between the distance from one point of the bow pair to a center and a distance of the other point to the center; and an average gradient phase match of all the bow points to an expected phase.

8. The method of claim 1, wherein fitting boat models to the detected bow candidates further comprises:

for a particular offset, orientation and model, computing, by the one or more processor, an average gradient magnitude and an average gradient phase-match between a gradient phase of the image at the outline points and an expected phase from the model; and computing a model score as a function of a score for bow candidate, the average gradient magnitude and the average phase-match from the model outline points; and determining, by the one or more processor, the best fit boat models for each bow candidate.

\* \* \* \* \*